United States Patent
Li et al.

(10) Patent No.: US 10,769,107 B2
(45) Date of Patent: Sep. 8, 2020

(54) FILE STORAGE METHOD, FILE SEARCH METHOD AND FILE STORAGE SYSTEM BASED ON PUBLIC-KEY ENCRYPTION WITH KEYWORD SEARCH

(71) Applicant: SHENZHEN UNIVERSITY, Shenzhen, Guangdong (CN)

(72) Inventors: Jianqiang Li, Guangdong (CN); Min Zhang, Guangdong (CN); Sailing Li, Guangdong (CN); Zhong Ming, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 191 days.

(21) Appl. No.: 16/162,353

(22) Filed: Oct. 16, 2018

(65) Prior Publication Data

US 2019/0050398 A1    Feb. 14, 2019

Related U.S. Application Data

(63) Continuation of application No. PCT/CN2017/080580, filed on Apr. 14, 2017.

(30) Foreign Application Priority Data

Apr. 18, 2016 (CN) .......................... 2016 1 0243440

(51) Int. Cl.
*G06F 21/62* (2013.01)
*G06F 16/14* (2019.01)
(Continued)

(52) U.S. Cl.
CPC .......... *G06F 16/14* (2019.01); *G06F 21/6209* (2013.01); *G06F 21/6218* (2013.01);
(Continued)

(58) Field of Classification Search
CPC ..... H04L 9/3073; G06F 21/60; G06F 21/602; G06F 21/62
See application file for complete search history.

(56) References Cited

U.S. PATENT DOCUMENTS

| 7,499,544 B2* | 3/2009 | Jao ........................ G06F 7/725 380/30 |
| 7,580,521 B1* | 8/2009 | Spies .................... H04L 9/3073 380/281 |

(Continued)

FOREIGN PATENT DOCUMENTS

| CN | 103873236 A | 6/2014 |
| CN | 104852801 A | 8/2015 |
| CN | 105262843 A | 1/2016 |

OTHER PUBLICATIONS

International Search Report of PCT Patent Application No. PCT/CN2017/080580 dated Jun. 29, 2017.

*Primary Examiner* — Lynn D Feild
*Assistant Examiner* — Richard A McCoy

(57) ABSTRACT

The invention provides a file storage method, a file search method and a file storage system based on public-key encryption with keyword search. The method comprises: receiving a user file storage request sent from a data possessor, acquiring access control attribute information for access to a user file, security level parameters and a keyword set of the user file, generating a file attribute vector of the user file by means of the access control attribute information and the keyword set, acquiring a public-secret key pair used for encrypting the file attribute vector from a pre-generated key space, encrypting the file attribute vector by means of a public key in the public-secret key pair to obtain a ciphertext corresponding to the file attribute vector, and transmitting the ciphertext corresponding to the file attribute vector and a ciphertext of the user file to a preset storage server.

7 Claims, 3 Drawing Sheets

(51) Int. Cl.
*H04L 9/08* (2006.01)
*H04L 29/08* (2006.01)
*H04L 9/06* (2006.01)
*H04L 9/30* (2006.01)

(52) U.S. Cl.
CPC .......... *H04L 9/0618* (2013.01); *H04L 9/0894* (2013.01); *H04L 9/30* (2013.01); *H04L 67/06* (2013.01)

(56) References Cited

U.S. PATENT DOCUMENTS

| | | | |
|---|---|---|---|
| 10,044,509 B1* | 8/2018 | Kirshner | H04L 9/3247 |
| 2004/0131191 A1* | 7/2004 | Chen | H04L 9/321 |
| | | | 380/282 |
| 2012/0063593 A1* | 3/2012 | Camenisch | G06F 21/6227 |
| | | | 380/44 |
| 2012/0207299 A1* | 8/2012 | Hattori | H04L 9/3073 |
| | | | 380/30 |
| 2012/0297188 A1* | 11/2012 | van der Linden | G06F 21/606 |
| | | | 713/165 |
| 2013/0290731 A1* | 10/2013 | Branton | H04L 9/0863 |
| | | | 713/189 |
| 2014/0294177 A1* | 10/2014 | Shastry | H04L 9/3013 |
| | | | 380/46 |
| 2015/0067331 A1* | 3/2015 | Jelitto | G06F 16/22 |
| | | | 713/168 |
| 2017/0019261 A1* | 1/2017 | Mandal | H04L 9/008 |

* cited by examiner

FILE STORAGE METHOD, FILE SEARCH METHOD AND FILE STORAGE SYSTEM BASED ON PUBLIC-KEY ENCRYPTION WITH KEYWORD SEARCH

CROSS REFERENCE TO RELATED APPLICATION

The present application is a Continuation Application of PCT application No. PCT/CN2017/080580 filed on Apr. 14, 2017, which claims the benefit of Chinese patent application No. 201610243440.9 filed on Apr. 18, 2016. All the above are hereby incorporated by reference.

BACKGROUND OF THE INVENTION

Technical Field

The invention belongs to the technical field of computers, and particularly relates to a file storage method, a file search method and a file storage system based on public-key encryption with keyword search.

Description of Related Art

As a novel cryptographic system, public-key encryption with keyword search allows users to conduct keyword search on data encrypted by public keys, and thus, the privacy and access mode of data receivers are protected against leakage. Meanwhile, a method is provided to allow users to conduct rapid and effective search operations without data decryption.

However, existing studies on public-key encryption with keyword search mainly focus on attribute-based encryption for achieving a multi-user access control policy or is only about multi-keyword search. During attribute encryption of existing methods for public-key encryption with keyword search, operation efficiency is low, and encryption security levels are uniform, resulting in low attribute encryption efficiency and failure to achieve differential protection.

BRIEF SUMMARY OF THE INVENTION

The objective of the invention is to provide a file storage method, a file search method and a file storage system based on public-key encryption with keyword search to solve the problems of long encryption response time and poor security caused by the absence of efficient file storage and search methods based on public-key encryption with keyword search in the security storage process of files in the prior art.

In one aspect, the invention provides a file storage method based on public-key encryption with keyword search. The file storage method based on public-key encryption with keyword search comprises the following steps:

A user file storage request sent from a data possessor is received, and access control attribute information for access to a user file, security level parameters and a keyword set of the user file are acquired;

a file attribute vector of the user file is generated by means of the access control attribute information and the keyword set;

a public-secret key pair used for encrypting the file attribute vector is acquired from a pre-generated key space according to the access control attribute information;

the file attribute vector is encrypted by means of a public key in the public-secret key pair according to the security level parameters to obtain a ciphertext corresponding to the file attribute vector; and the ciphertext corresponding to the file attribute vector and a ciphertext of the user file are transmitted to a preset storage server.

In another aspect, the invention provides a file search method based on public-key encryption with keyword search. The file search method based on public-key encryption with keyword search comprises the following steps:

a user file search request sent from a file visitor is received, wherein the user file is stored through the file storage method based on public-key encryption with keyword search;

an access token is generated according to attribute information of the file visitor, search keywords and a secret key in the public-secret key pair;

the access token is compared with the ciphertext of the file attribute vector; and when the access token is matched with the ciphertext of the file attribute vector, the ciphertext of the user file is transmitted to the file visitor.

In another aspect, the invention further provides a file storage system based on public-key encryption with keyword search. The file storage system based on public-key encryption with keyword search comprises:

a control parameter acquisition unit used for receiving the user file storage request sent from the data possessor and acquiring the access control attribute information for access to the user file, the security level parameters and the keyword set of the user file;

a vector generation unit used for generating the file attribute vector of the user file by means of the access control attribute information and the keyword set;

a key pair acquisition unit used for acquiring the public-secret key pair for encrypting the file attribute vector from the pre-generated key space according to the access control attribute information;

a vector encryption unit used for encrypting the file attribute vector by means of the public key in the public-secret key pair according to the security level parameters; and a ciphertext transmission unit used for transmitting the ciphertext corresponding to the file attribute vector and the ciphertext of the user file to the preset storage server.

In the embodiments of the invention, when the user file storage request is received, the access control attribute information for access to the user file, the security level parameters and the keyword set of the user file are acquired, the file attribute vector of the user file is generated by means of the access control attribute information and the keyword set, then the file attribute vector is encrypted by means of the public key in the public-secret key pair according to the security level parameters to obtain the ciphertext corresponding to the file attribute vector, and finally, the ciphertext corresponding to the file attribute vector and the ciphertext of the user file are transmitted to the preset storage server. Thus, based on the attribute encryption mechanism, flexible access control is achieved by adding multi-keyword set fields, multi-word search of the ciphertexts is also achieved, differential encryption services are provided, and the security of the file is improved.

DETAILED DESCRIPTION OF THE INVENTION

For a better understanding of the objective, technical scheme and advantages of the invention, the invention is further described in detail as follows in combination with the drawings and embodiments. It would appreciate that the specific embodiments in the following description are only used for explaining the invention, but are not used for limiting the invention.

Concrete realization of the invention is described in detail as follows in combination with the specific embodiments.

First Embodiment

Figure 1:
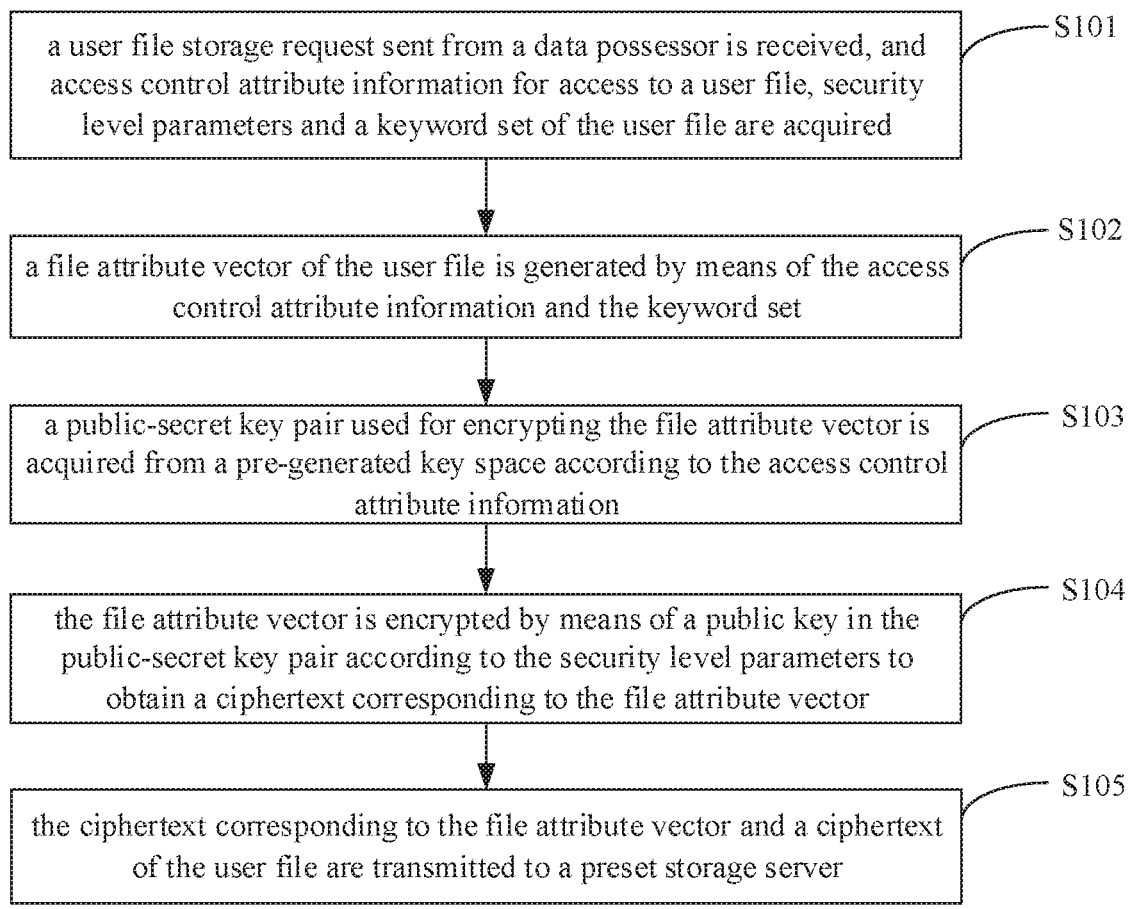
FIG. 1 is an implementation flow diagram of a file storage method based on public-key encryption with keyword search in the first embodiment of the invention.

FIG. 1 shows the implementation process of a file storage method based on public-key encryption with keyword search in the first embodiment of the invention. For a brief description, only parts related to this embodiment of the invention are shown. A detailed description of this embodiment is as follows: A file storage method based on public-key encryption with keyword search comprises:

Step S101, a user file storage request sent from a data possessor is received, and access control attribute information for access to a user file, security level parameters and a keyword set of the user file are acquired.

The file storage method in this embodiment of the invention is applicable to a file storage or management system, such as a cloud file management system, which may comprise a client, a server and the like.

In this embodiment of the invention, when the data possessor wants to send or upload the file to a storage server, the data possessor can set attribute information of visitors allowed to have access to the file (namely the access control attribute information) so as to control the attributes of users having access to the file, and thus, the security of the file is improved. In addition, the security level parameters are used for indicating the importance or security requirements of the file. The keyword set of the user file is manually set by the data possessor when the file is uploaded or is automatically extracted by client software.

Step S102, a file attribute vector of the user file is generated by means of the access control attribute information and the keyword set.

In this embodiment of the invention, the file attribute vector is used for access control and search of the file and mainly consists of two parts: an attribute set and a keyword set, wherein the attribute set information refers to an attribute information set according to the requirements of the data possessor, namely indispensable attributes of visitors. Illustratively, when the file to be stored is a user medical record, it is required that the visitors must be doctors with certain attributes, for instance, the attribute information set can be doctors possessing certain positions in certain departments of certain hospitals.

Step S103, a public-secret key pair used for encrypting the file attribute vector is acquired from a pre-generated key space according to the access control attribute information.

In this embodiment of the invention, the file storage or management system needs to pre-generate a key space for files of the same type or user files of this type according to an input key space parameter, wherein the key space parameter is used for indicating the values of all dimensions in the file attribute vector. In this key space:

Public key $$PK = \left[I, \left(\overline{T_{i,r}} = g_1^{1/t_{i,r}}, \overline{V_{i,r}} = g_1^{1/v_{i,r}}\right)_{i \in \{1,\ldots,L\}, r \in \Sigma}\right];$$

Secrete key $SK=[I, {}^{(t_{i,r},v_{i,r}) i \in \{1,\ldots,L\}, r \in \Sigma}]_o$ Wherein, I refers to a prime-order asymmetric bilinear pairing example, $I=[^p, g^1, g^2, G^1, G^2, GT, ^e]$, $1 \leq i \leq L$, $r \in \Sigma$, $t_{i,r}$, $v_{i,r} \in Z_p$, $$\overline{T_{i,r}} = g_1^{1/t_{i,r}}, \overline{V_{i,r}} = g_1^{1/v_{i,r}},$$

p refers to the order number of a prime order, $g_1$ refers to a generator in group G1, g2 refers to a generator in group G2, $G_1$ refers to a multiplication cycle group, $G_2$ refers to another multiplication cycle group, GT refers to an integer order group, e refers to a bilinear pairing operation, L refers to the key space parameter which particularly refers to the length of the file attribute vector, r refers to the value of the vector in each dimension, $\Sigma$ refers to a possible value set of the vector in each dimension, $v_{i,r}$ refers to a random security number randomly generated according to the dimensionality i and the vector value r in each dimension, $t_{i,r}$ and also refers to a random security number randomly generated according to the dimensionality i and the vector value r in each dimension.

In this embodiment of the invention, after the access control attribute information is acquired, the public-secret key pair used for encrypting the file attribute vector can be acquired from the pre-generated key space according to the access control attribute information.

Step S104, the file attribute vector is encrypted by means of a public key in the public-secret key pair according to the security level parameters to obtain a ciphertext corresponding to the file attribute vector.

In this embodiment of the invention, the file attribute vector is encrypted by means of the public key in the public-secret key pair through prime-order bilinear pairing operations to obtain the ciphertext corresponding to the file attribute vector, and by the fact that the file attribute vector is encrypted through prime-order bilinear pairing operations, time and space are greatly saved for the system, and file encryption efficiency is improved. Furthermore, secondary encryption corresponding to a second encryption security level can be conducted on the ciphertext corresponding to the file attribute vector according to the security level parameters, and thus, differential security services are provided for the data possessor. Please see the description of the subsequent embodiments for the specific encryption process.

Step S105, the ciphertext corresponding to the file attribute vector and a ciphertext of the user file are transmitted to a preset storage server.

In this embodiment of the invention, based on the attribute encryption mechanism, flexible access control is achieved by adding multi-keyword set fields, multi-word search of the ciphertexts is also achieved, differential encryption services are provided, and the security of the file is improved.

Second Embodiment

Figure 2:
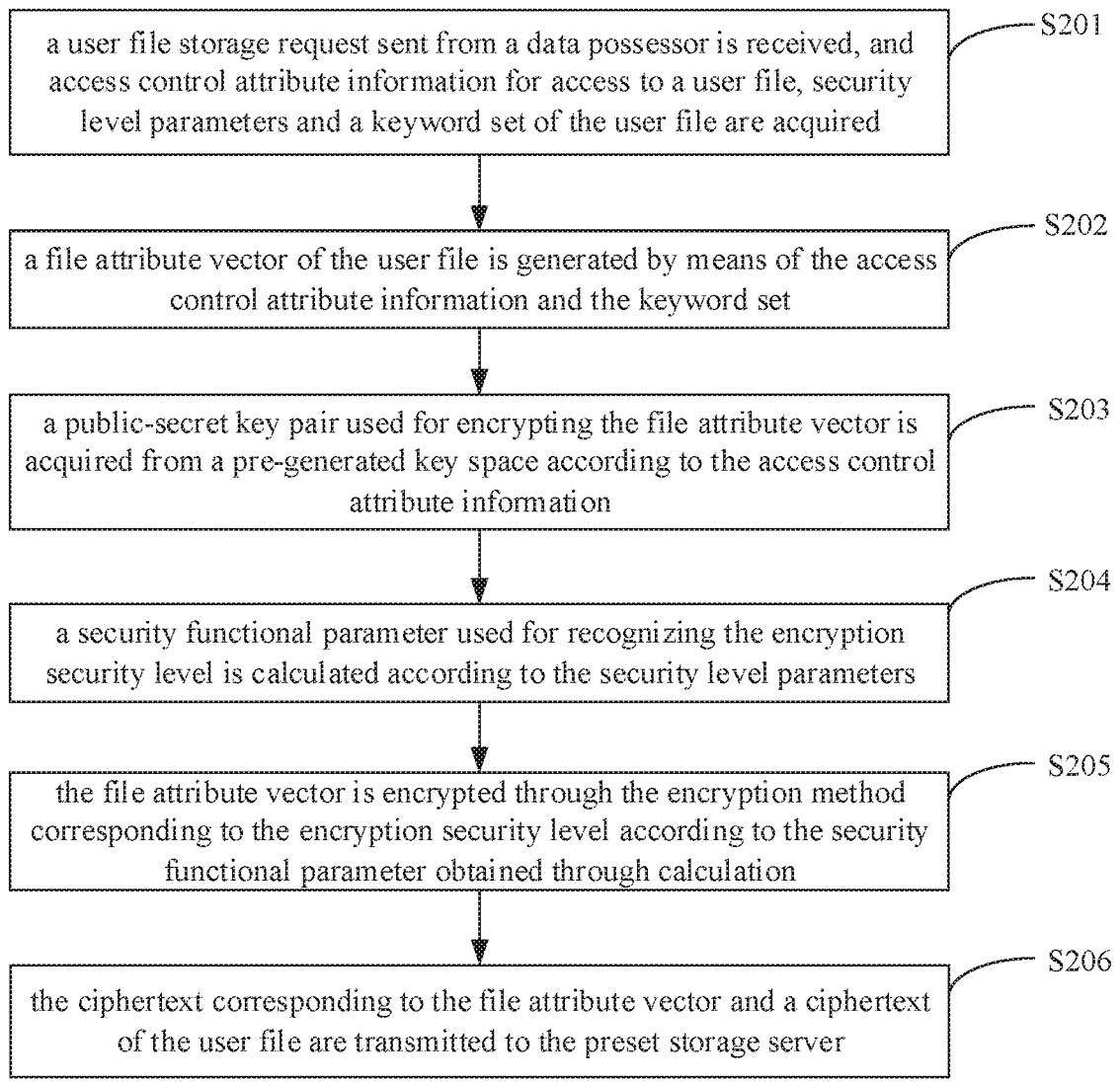
FIG. 2 is an implementation flow diagram of a file storage method based on public-key encryption with keyword search in the second embodiment of the invention.

FIG. 2 shows the implementation process of a file storage method based on public-key encryption with keyword search in the second embodiment of the invention. For a brief description, only parts related to this embodiment of the invention are shown. The detailed description of this embodiment is as follows: A file storage method based on public-key encryption with keyword search comprises:

Step S201, a user file storage request sent from a data possessor is received, and access control attribute information for access to a user file, security level parameters and a keyword set of the user file are acquired.

The file storage method in this embodiment of the invention is applicable to a file storage or management system, such as a cloud file management system, which may comprise a client, a server and the like.

Step S202, a file attribute vector of the user file is generated by means of the access control attribute information and the keyword set.

Step S203, a public-secret key pair used for encrypting the file attribute vector is acquired from a pre-generated key space according to the access control attribute information.

Steps S201-S203 in this embodiment of the invention are identical with steps S101-S103 in the first embodiment in implementation and thus are not described anymore.

Step S204, a security functional parameter used for recognizing the encryption security level is calculated according to the security level parameters.

In this embodiment of the invention, different encryption security levels are adopted for encrypting the user file, specifically, multiple encryption security levels can be set according to requirements.

Preferably, in this embodiment of the invention, three encryption security levels can be adopted for the user file and separately correspond to different encryption methods or different encryption strengths. Accordingly, corresponding security functional parameter ranges are set, the security functional parameter is obtained through calculation according to the security level parameters input by the user or defaulted by the system. Wherein, the security level parameters indicate the security level of the data possessor and the importance of the file uploaded by the data possessor.

Preferably, after the security level parameters are received, the security functional parameter Sec is calculated according to the formula $$Sec = \left(\frac{w_1}{I} + \frac{w_2}{F}\right)(1 - \rho_{Sec_3}) + \rho_{Sec_3},$$

wherein I and F are the security level parameters, $w_1$ and $w_2$ are weights corresponding to I and F, and $\rho_{sec_3}$ is a threshold corresponding to a preset basic encryption security level.

Preferably, under the condition that three encryption security levels are adopted, if $\rho_{Sec_3} \leq Sec \leq \rho_{Sec_2}$, an encryption method corresponding to the basic encryption security level (basic level) is adopted; if $\rho_{Sec_2} \leq Sec \leq \rho_{Sec_1}$, an encryption method (medium-level) which is one level higher than the basic encryption security level is adopted; and if $\rho_{Sec_1} \leq Sec$, an encryption method of the highest level compared with the basic encryption security level is adopted, wherein $\rho_{sec_2}$ and $\rho_{sec_1}$ are detection thresholds corresponding to the preset medium encryption security level and the preset highest encryption security level.

In step S205, the file attribute vector is encrypted through the encryption method corresponding to the encryption security level according to the security functional parameter obtained through calculation.

In this embodiment of the invention, when the security functional parameter Sec obtained through calculation meets $\rho_{Sec_2} \leq Sec \leq \rho_{Sec_1}$, it is determined that the encryption security level corresponding to the security functional parameter is the second encryption security level (medium), and the file attribute vector is encrypted by means of the public key in the public-secret key pair through prime-order bilinear pairing operation to obtain a ciphertext $CT_x^v = (X_i, W_i)^L_{i=1}$ corresponding to the file attribute vector, wherein:

$X_i = \overline{T_{i,x_i}}^{a_i}$, if $x_i \neq *$; $W_i = \overline{V_{i,x_i}}^{a_i}$, if $x_i \neq *$;

$X_i = \emptyset$, if $x_i = *$ and $i \neq L$; $W_i = \emptyset$, if $x_i = *$ and $i \neq L$;$_o$ $x_i$ refers to the value of the vector x in the $i^{th}$ dimension and corresponds to r when the key space is initialized, * refers to a wildcard character, L is the length of the file vector, $a_i$ is a random number generated corresponding to the $i^{th}$ dimension, and $X_i$ and $W_i$ are intermediate variable values.

In this process, primary encryption is conducted. Then, secondary encryption corresponding to the second encryption security level is conducted on the ciphertext, obtained after primary encryption, corresponding to the file attribute vector, so that the ciphertext, subjected to secondary encryption, of the file attribute vector is obtained. When the functional security parameter Sec obtained through calculation is greater than $\rho_{sec_1}$, secondary encryption corresponding to the highest encryption security level is conducted on the ciphertext, obtained after primary encryption, corresponding to the file attribute vector, so that the ciphertext, subjected to secondary encryption, of the file attribute file is obtained.

In this way, secondary encryption corresponding to the encryption security level can be conducted on the ciphertext corresponding to the file attribute vector according to the security level parameters, and differential security services are provided for the data possessor. Wherein, existing encryption methods can be used for secondary encryption, for instance, AES symmetrical encryption can be used for medium-level encryption, and RSA asymmetric encryption can be used for the highest-level encryption. Of course, other encryption methods can also be adopted. In order to facilitate subsequent decryption, the encryption security level of the file attribute vector should be stored.

Step S206, the ciphertext corresponding to the file attribute vector and a ciphertext of the user file are transmitted to the preset storage server.

In this embodiment of the invention, three encryption levels are adopted for the file attribute vector, the security functional parameter used for recognizing the encryption security level is calculated according to the input security level parameters, and then the file attribute vector is encrypted through the encryption method corresponding to the security functional parameter or the encryption security level. Thus, differential secure encryption services are provided for the data possessor; and meanwhile, the file attribute vector is encrypted through prime-order bilinear pairing operation, so that encryption efficiency is improved.

Embodiment 3

Figure 3:
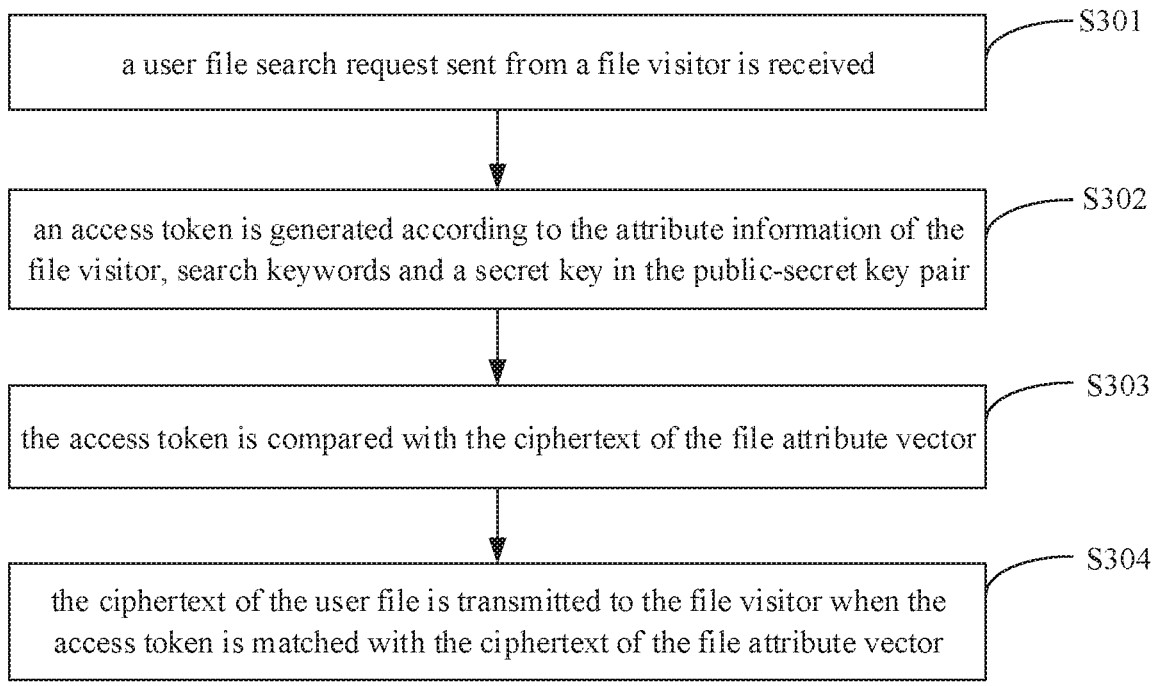
FIG. 3 is an implementation flow diagram of a file search method based on public-key encryption with keyword search in the third embodiment of the invention.

FIG. 3 shows the implementation process of a file search method based on public-key encryption with keyword search in the third embodiment of the invention. For a brief description, only parts related to this embodiment of the invention are shown. The detailed description of this embodiment is as follows: A file search method based on public-key encryption with keyword search comprises:

Step S301, a user file search request sent from a file visitor is received.

Step S302, an access token is generated according to the attribute information of the file visitor, search keywords and a secret key in the public-secret key pair.

In this embodiment of the invention, after the search request sent from the file visitor is received to search for the user file stored according to the file storage method in the first embodiment or the second embodiment, the attribute information of the file visitor, the search keywords, and the corresponding secrete key are acquired, and then the access token $T_y^{\tilde{w}} = (Y_i, M_i)_{i=1}^L$ is generated according to the attribute information, the search keywords and the secrete key, wherein, $Y_i = T_{i,y_i}^{s-s_i}$, $M_i = V_{i,y_i}^{s_i}$, $$T_{i,y_i} = g_2^{t_{i,y_i}}, V_{i,y_i} = g_2^{v_{i,y_i}},$$

$Y_i$ refers to an intermediate value, $T_i$ refers to an intermediate value, $y_i$ refers to the value of an i-dimension element in the access token, s refers to a random security value, $s_i$ refers to a random security value generated corresponding to the $i^{th}$ dimension of the vector, $t_{i,yi}$ refers to a random security value ti,r correspondingly generated under the condition that the value of the vector in the $i^{th}$ dimension is yi when the key space is initialized, and $v_{i,yi}$ refer to a random security value vi,r correspondingly generated under the condition that the value of the vector in the $i^{th}$ dimension is yi when the key space is initialized.

Step S303, the access token is compared with the ciphertext of the file attribute vector.

Step S304, the ciphertext of the user file is transmitted to the file visitor when the access token is matched with the ciphertext of the file attribute vector.

In this embodiment of the invention, when the access token is compared with the ciphertext of the file attribute vector, the corresponding encryption security level for encrypting the file attribute vector is acquired; when the encryption security level is the second encryption security level, the ciphertext, subjected to secondary encryption, of the file attribute vector is decrypted, so that the ciphertext corresponding to the file attribute vector is obtained; and finally, the access token and the ciphertext of the file attribute vector are operated through a preset decryption operation formula Match(PK, $T_y^{\tilde{w}}$, $CT_x^v$)=$\Pi_{i=1}^L e(X_i,Y_i)e(W_i, M_i)$. When Match (PK, $T_y^{\tilde{w}}$, $CT_x^v$)=1, the operational result is true, and in this case, the ciphertext corresponding to the user file is transmitted to the file visitor. Wherein, PK refers to the public-secrete key pair, $T_y^{\tilde{w}}$ refers to the search request access token sent from the search user, $CT_x^v$ refers to an indexical file vector ciphertext stored in a cloud server, $X_i$ refers to an intermediate value generated in the encryption process, $Y_i$ refers to an intermediate value generated when the access token is generated, $W_i$ refers to an intermediate value generated in the encryption process, $M_i$ refers to an intermediate value generated when the token is generated, and e refers to a bilinear pairing operation.

Particularly, when the ciphertext, subjected to secondary encryption, of the file attribute vector is decrypted, a decryption method corresponding to the encryption method is adopted.

In this embodiment of the invention, search of the ciphertext of the user file can be achieved through the above steps. A strict search access control policy can be realized to adapt to a multi-user sharing application scene, multi-keyword accurate search can be achieved, and encryption services on different security levels can be provided according to identify information of different users and the importance of files under a resource-constrained condition, and thus, computing resources are saved.

Those ordinarily skilled in this field would appreciate that all or parts of the steps of the methods in the above-mentioned embodiments can be realized through relevant hardware instructed by programs, and the programs can be stored in a computer-readable storage medium such as a ROM/RAM, a disk or a CD.

Fourth Embodiment

Figure 4:
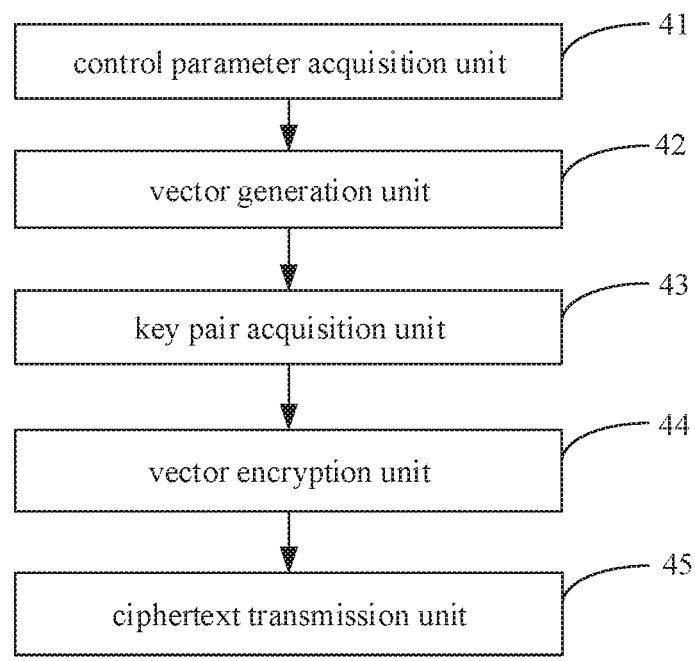
FIG. 4 is a structural diagram of a file storage system based on public-key encryption with keyword search in a fourth embodiment of the invention.

FIG. 4 shows the structure of a file storage system based on public-key encryption with keyword search in the fourth embodiment of the invention. For a brief description, only parts related to this embodiment of the invention are shown. A file storage system based on public-key encryption with keyword search comprises:

a control parameter acquisition unit 41 used for receiving the user file storage request sent from the data possessor and acquiring the access control attribute information for access to the user file, the security level parameters and the keyword set of the user file;

a vector generation unit 42 used for generating the file attribute vector of the user file by means of the access control attribute information and the keyword set;

a key pair acquisition unit 43 used for acquiring the public-secret key pair for encrypting the file attribute vector from the pre-generated key space according to the access control attribute information;

a vector encryption unit 44 used for encrypting the file attribute vector by means of the public key in the public-secret key pair according to the security level parameters; and a ciphertext transmission unit 45 used for transmitting the ciphertext corresponding to the file attribute vector and the ciphertext of the user file to the preset storage server.

In this embodiment of the invention, all units of the file storage system based on public-key encryption with keyword search can be realized through corresponding hardware or software units, can be independent software or hardware units, and can also be integrated into one software or hardware unit, and the specific realization method of the units of the file storage system is not limited in this invention. Please refer to the description of the first embodiment and the second embodiment for the concrete implementation of the units, and repeated description is not given anymore.

The above embodiments are only preferred embodiments of the invention and are not used for limiting the invention. Any modifications, equivalent substitutes and improvements based on the spirit and principle of the invention should fall within the protection scope of the invention.

What is claimed is:

1. A file storage method based on public-key encryption with keyword search, characterized by comprising the following steps: receiving a user file storage request sent from a data possessor and acquiring access control attribute information for access to a user file, security level parameters and a keyword set of the user file; generating a file attribute vector of the user file by means of the access control attribute information and the keyword set; acquiring a public-secret key pair used for encrypting the file attribute vector from a pre-generated key space according to the access control attribute information; encrypting the file attribute vector by means of a public key in the public-secret key pair according to the security level parameters to obtain a ciphertext corresponding to the file attribute vector; and transmitting the ciphertext corresponding to the file attribute vector and a ciphertext of the user file to a preset storage server;

wherein the step of encrypting the file attribute vector by means of the public key in the public-secret key pair according to the security level parameters to obtain the ciphertext corresponding to the file attribute vector comprises the sub-steps: calculating a security functional parameter used for recognizing an encryption security level according to the security level parameters; and encrypting the file attribute vector through an encryption method corresponding to the encryption security level according to the security functional parameter obtained through the calculation;

wherein the step of calculating the security functional parameter used for recognizing the encryption security level according to the security level parameters comprises the sub-step: calculating the security functional parameter Sec according to a formula $$\text{Sec} = \left(\frac{w_1}{I} + \frac{w_2}{F}\right)(1 - \rho_{Sec_3}) + \rho_{Sec_3},$$

wherein I and F are the security level parameters, $w_1$ and $W2$ are weights corresponding to I and F and $P_{sec3}$, is a threshold corresponding to a preset basic encryption security level;

wherein the step of encrypting the file attribute vector through the encryption method corresponding to the encryption security level according to the security functional parameter obtained through calculation comprises the sub-steps:

when the security functional parameter Sec meets $\rho_{Sec_2} \leq \text{Sec} \leq \rho_{Sec_1}$, determining that the encryption security level corresponding to the security functional parameter is a second encryption security level, wherein $P_{sec1}$ and $P_{sec2}$ are thresholds corresponding to progressively-increased encryption security levels; encrypting the file attribute vector by means of the public-key in the public-secret key pair through prime-order bilinear pairing operation to obtain the ciphertext corresponding to the file attribute vector; and conducting secondary encryption corresponding to the second encryption security level on the ciphertext of the file attribute vector to obtain a secondarily-encrypted ciphertext of the file attribute vector.

2. The method according to claim 1, wherein the step of encrypting the file attribute vector by means of the public key in the public-secret key pair according to the security level parameters to obtain the ciphertext corresponding to the file attribute vector comprises the sub-step:

encrypting the file attribute vector by means of the public key in the public-secret key pair through prime-order bilinear pairing operation to obtain the ciphertext corresponding to the file attribute vector.

3. The method according to claim 1, wherein before the step of acquiring the access control attribute information for access to the user file, the security level parameters and the keyword set of the user file, the method further comprises:

generating the key space according to an input key space parameter.

4. A file search method based on public-key encryption with keyword search, characterized by comprising: receiving a user file search request sent from a file visitor, wherein a user file is stored by implementing each limitation of the file storage method found in claim 1: generating an access token according to attribute information of the file visitor, search keywords and a secret key in the public-secret key pair; comparing the access token with the ciphertext of the file attribute vector; and transmitting the ciphertext of the user file to the file visitor when the access token is matched with the ciphertext of the file attribute vector.

5. The method according to claim 4, wherein the step of comparing the access token with the ciphertext of the file attribute vector comprises the sub-steps:

acquiring an encryption security level for encrypting the file attribute vector;

when the encryption security level is the second encryption security level, decrypting the secondarily-encrypted ciphertext of the file attribute vector to obtain the ciphertext corresponding to the file attribute vector; and conducting operations on the access token and the ciphertext of the file attribute vector according to a preset decryption operational formula.

6. The method according to claim 5, wherein the step of transmitting the ciphertext of the user file to the file visitor when the access token is matched with the ciphertext of the file attribute vector comprises the sub-step:

transmitting the ciphertext of the user file to the user visitor when an operational result is true.

7. A file storage system based on public-key encryption with keyword search, characterized by comprising:

a memory including instructions that when executed perform the steps of:

receiving a user file storage request sent from the data possessor and acquiring the access control attribute information for access to the user file, the security level parameters and the keyword set of the user file;

generating the file attribute vector of the user file by means of the access control attribute information and the keyword set;

acquiring the public-secret key pair for encrypting the file attribute vector from the preset key space according to the access control attribute information;

encrypting the file attribute vector by means of the public key in the public-secret key pair according to the security level parameters; and transmitting the ciphertext corresponding to the file attribute vector and the ciphertext of the user file to the preset storage server;

wherein the user file is stored in the preset storage server by implementing each limitation of the file storage method found in claim 1.

* * * * *